(12) United States Patent
Shearer

(10) Patent No.: US 8,243,081 B2
(45) Date of Patent: *Aug. 14, 2012

(54) METHODS AND SYSTEMS FOR PARTITIONING A SPATIAL INDEX

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/466,129

(22) Filed: Aug. 22, 2006

(65) Prior Publication Data

US 2008/0049016 A1 Feb. 28, 2008

(51) Int. Cl.
 *G06F 15/16* (2006.01)
(52) U.S. Cl. ........................................................ 345/502
(58) Field of Classification Search .................... 345/426
 See application file for complete search history.

(56) References Cited

U.S. PATENT DOCUMENTS

| | | | |
|---|---|---|---|
| 5,933,146 A * | 8/1999 | Wrigley | 345/420 |
| 6,111,582 A | 8/2000 | Jenkins | |
| 6,587,110 B1 | 7/2003 | Kunimatsu et al. | |
| 7,002,571 B2 | 2/2006 | Lake et al. | |
| 7,012,604 B1 | 3/2006 | Christie et al. | |
| 7,164,420 B2 | 1/2007 | Ard | |
| 7,289,118 B2 | 10/2007 | Schmittler et al. | |
| 7,737,974 B2 | 6/2010 | Mejdrich et al. | |
| 7,868,891 B2 * | 1/2011 | Wexler et al. | 345/503 |
| 2003/0227455 A1 | 12/2003 | Lake et al. | |
| 2006/0059494 A1 | 3/2006 | Wexler et al. | |
| 2006/0066607 A1 | 3/2006 | Schmittler et al. | |
| 2007/0182732 A1 | 8/2007 | Woop et al. | |
| 2008/0043018 A1 | 2/2008 | Keller et al. | |

FOREIGN PATENT DOCUMENTS

JP 02242387 A 9/1990

OTHER PUBLICATIONS

Marchesin, Stephane and Catherine Mongenet and Jean-Michel Dischler. "Dynamic Load Balancing for Parallel Volume Rendering". Eurographics Symposium on Parallel Graphics and Visualization. Eurographics Association. May 2006. p. 51-58.*

Tong-Yee Lee et al: "Parallel implementation of ray-tracing algorithm onthe Intel Delta parallel computer", Parallel Processing Symposium, 1995, Proceedings., 9th International Santa Barbara, CA, USA, Apr. 25-28, 1995, Los Alamitos, CA, USA, IEEE Comput. Soc., Apr. 25, 1995, pp. 688-692.

(Continued)

*Primary Examiner* — Aaron M Richer
(74) *Attorney, Agent, or Firm* — Patterson & Sheridan LLP

(57) ABSTRACT

Embodiments of the invention provide devices and techniques for partitioning a spatial index. In one embodiment of the invention, an image processing system may partition a spatial index into a plurality of portions such that different processing elements may be responsible for traversing a ray through different portions of the spatial index. The determination of where to partition the spatial index may be made based on any number of factors. For example, according to some embodiments of the invention, the spatial index may be partitioned to evenly distribute workload (e.g., determined by real-time performance metrics) amongst multiple processing elements. Partitioning of the spatial index to distribute workload may be based on the total number of nodes, the number of leaf nodes or the number of primitives which will be included in each resulting partition.

20 Claims, 7 Drawing Sheets

OTHER PUBLICATIONS

C Muller, M. Strenget, and T. Erti. Optimized Volume Raycasting for Graphics-Hardware-based Cluster Systems. In Eurographics Symposium onParallel Graphics and Visualization (EGPGV06) May 2006, pp. 59-66. Eurographics Association.

Snyder, J. and Lengyel, J.:. Visibility sorting and compositing without splitting for image layer decompositions. In Proceedings of the 25th Annual Conference on Computer Graphics and interactive Techniques SIGGRAPH 1998. ACM, New York, NY,219-230. DOI= http://doi.acm.org/10.1145/280814.280878.

S. Marchesin, C. Mongenet J.-M. Dischler:, Dynamic load balancing for parallel volume rendering, in: Eurographics Symposium on Parallel Graphics and Visualization, Eurographics Association, May 2006, pp. 51-58.

Foley, T. and Sugerman, J. 2005. KD-tree acceleration structures for a GPU raytracer. In Proceedings of the ACM SIGGRAPH/EUROPGRAPHICS Conference on Graphics Hardware (Los Angeles, California, Jul. 30-31, 2005). HWWS '05. ACM, New York, NY, 15-22.DOI= http://doi.acm.org/10.1145/1071866.1071869.

Lee W.-J et al.: "Adaptive and Scalable Load Balancing Scheme for Sort-Last Parallel Volume Rendering on GPU Clusters", International Workshop on Volume Graphics, Jun. 20, 2005. Stony Brook, New York, USA.

Reshetov, A. et al.: Multi-Level Ray Tracing Algorithm, ACM Transactions on Graphics, ACM Jul. 2005, pp. 1176-1185 vol. 24, No. 3, New York, New York, USA.

\* cited by examiner

METHODS AND SYSTEMS FOR PARTITIONING A SPATIAL INDEX

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of partitioning a spatial index having nodes defining bounding volumes of a three dimensional scene is provided. The method generally comprising: providing a first processing element and a second processing element; and partitioning the spatial index into at least a first portion and a second portion, wherein the first processing element executes algorithms associated with traversing a ray through the first portion, and wherein the second processing element executes algorithms associated with traversing a ray through the second portion.

According to another embodiment of the invention a method of traversing a spatial index having nodes defining bounding volumes of a three dimensional scene is provided. The method generally comprising: partitioning the spatial index into at least a first partition and a second partition by creating at least one partition boundary through at least one branch of the spatial index; generating a ray into the scene; traversing the spatial index by taking branches from internal nodes until a leaf node is reached, wherein branches are taken based on whether the ray intersects bounding volumes defined by the nodes; and passing information defining the ray from a first processing element to a second processing element when the branch containing the partition boundary is taken.

According to another embodiment of the invention a system is provided. The system generally comprising: a spatial index having nodes defining bounding volumes of a three dimensional scene; a first processing element; a second processing element; and an image processing system. The image processing system generally configured to partition the spatial index into at least a first portion and a second portion, wherein the first processing element executes algorithms associated with traversing a ray through the first portion, and wherein the second processing element executes algorithms associated with traversing a ray through the second portion.

DETAILED DESCRIPTION OF THE PREFERRED EMBODIMENTS

Embodiments of the invention provide devices and techniques for partitioning a spatial index. In one embodiment of the invention, an image processing system may partition a spatial index into a plurality of portions such that different processing elements may be responsible for traversing a ray through different portions of the spatial index. The determination of where to partition the spatial index may be made based on any number of factors. For example, according to some embodiments of the invention, the spatial index may be partitioned to evenly distribute workload amongst multiple processing elements. Partitioning of the spatial index to evenly distribute workload may be based on the number of internal nodes which will be included in each resulting partition, the number of leaf nodes which will be included in each resulting partition, or the number of primitives which will be included in each resulting partition.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

Figure 1:
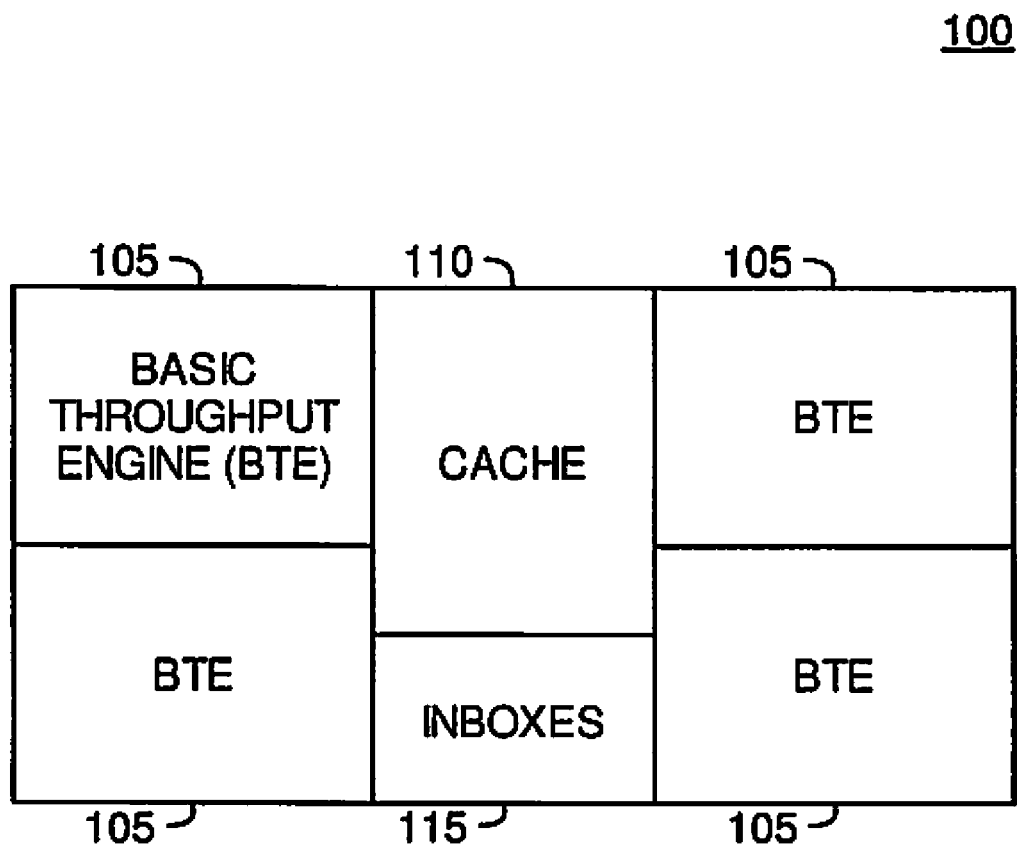
FIG. 1 illustrates a multiple core processing element, according to one embodiment of the invention.

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
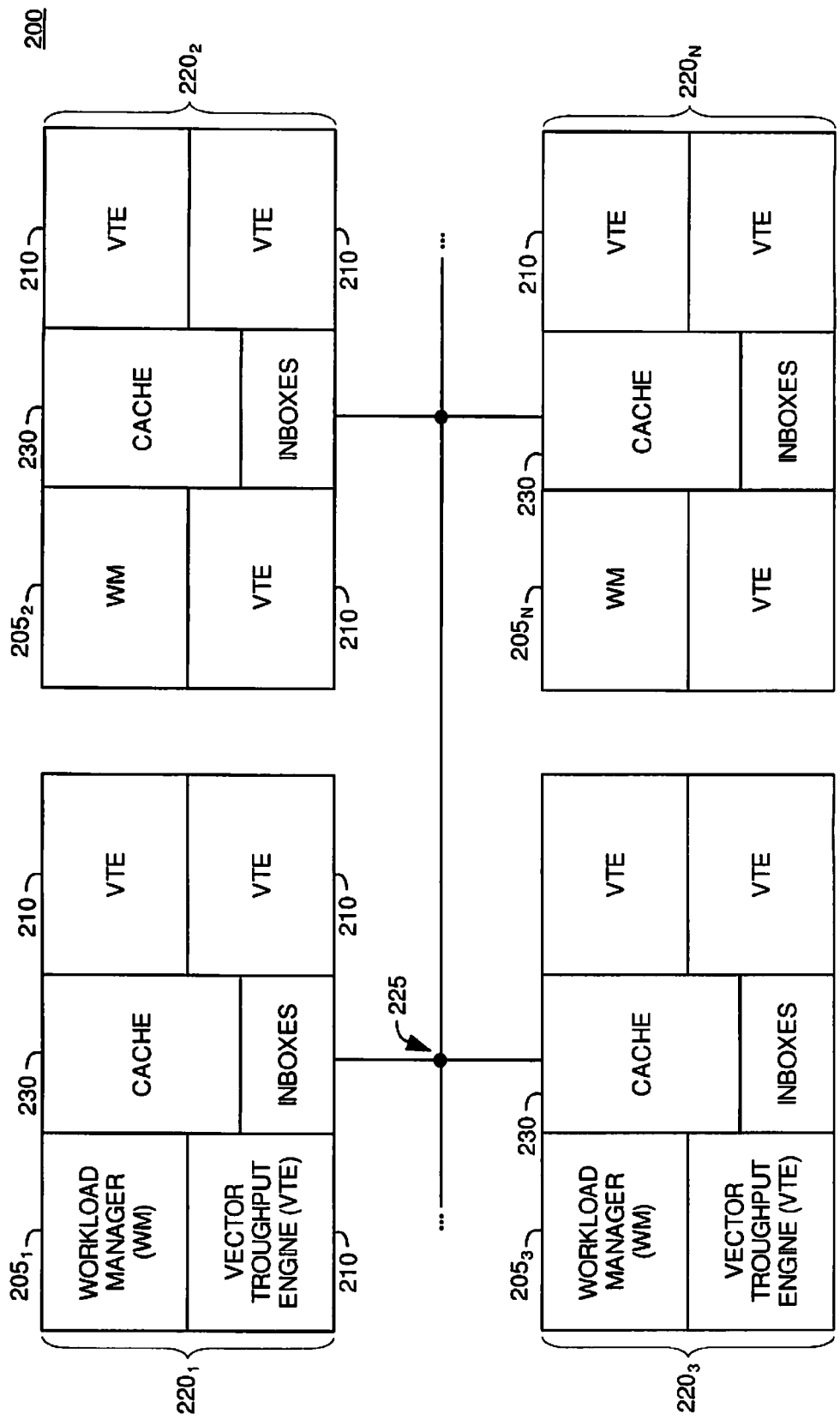
FIGS. 2 and 6 illustrate multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
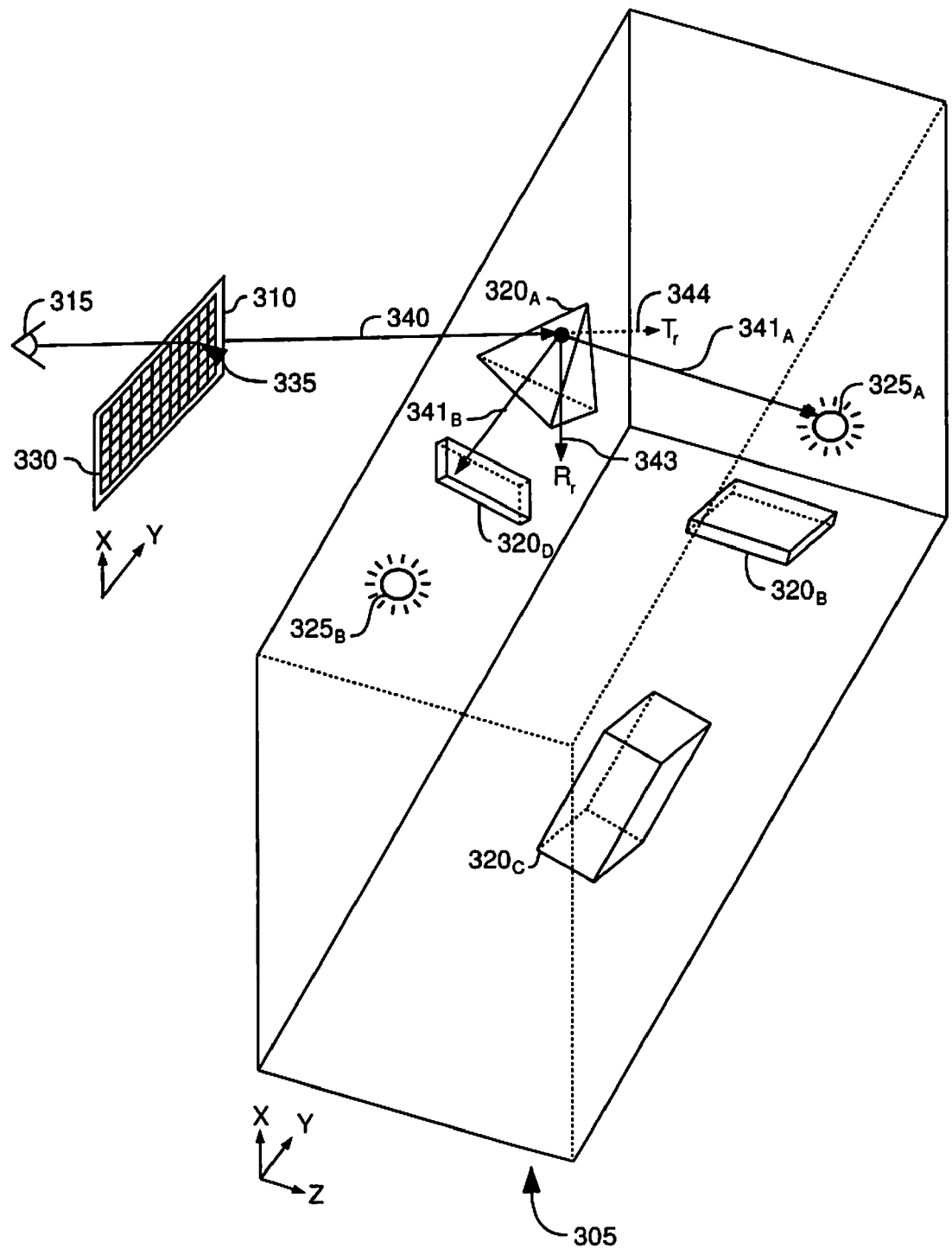
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
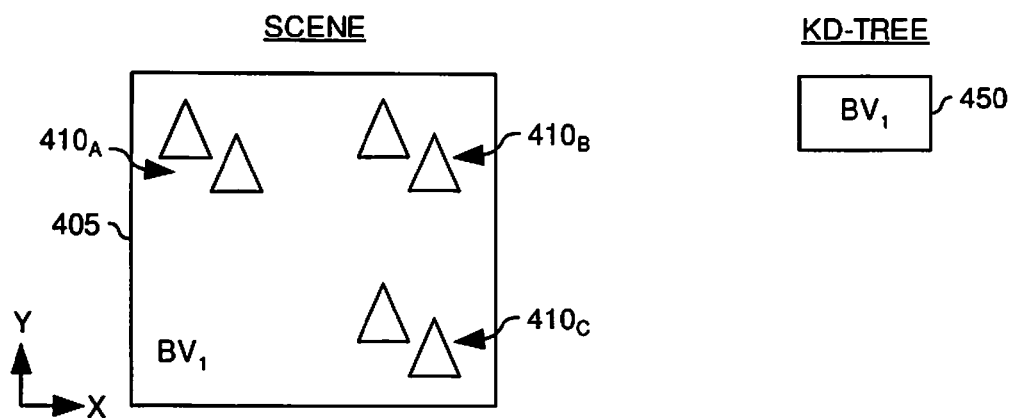
FIGS. 4A-4C illustrate a two dimensional space to be rendered by an image processing system and a corresponding spatial index created by an image processing system, according to one embodiment of the invention.
Figure 4B:
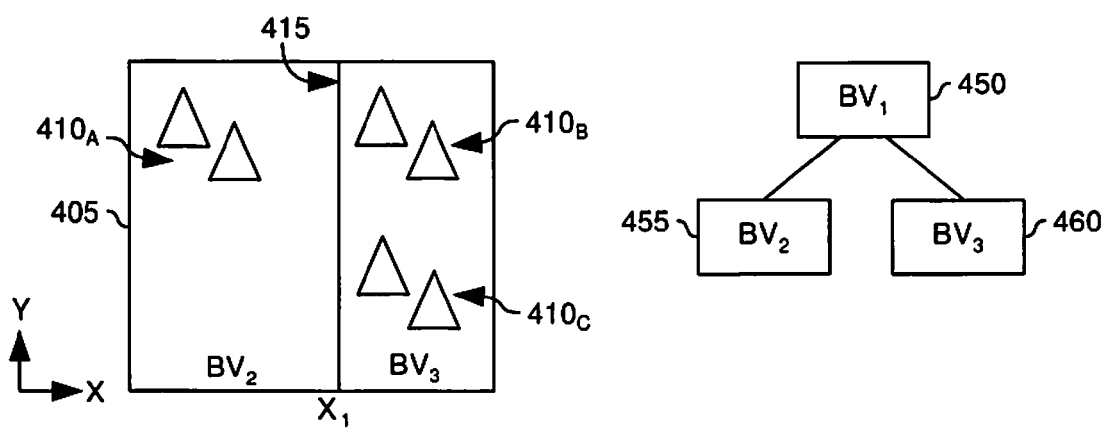
Figure 4C:
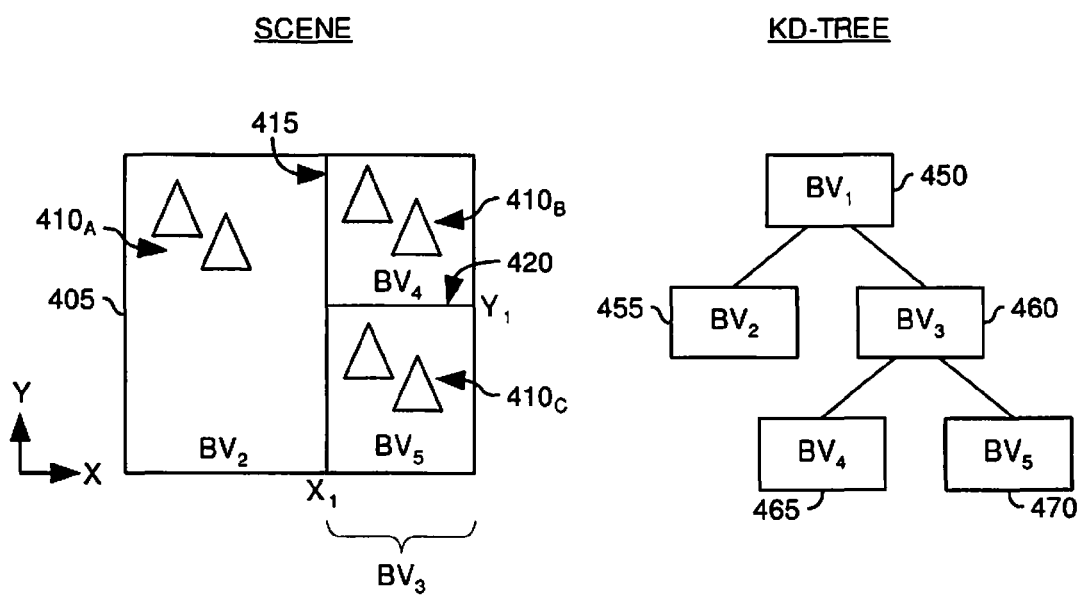

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$ and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Exemplary Spatial Index Partitions

Figure 5:
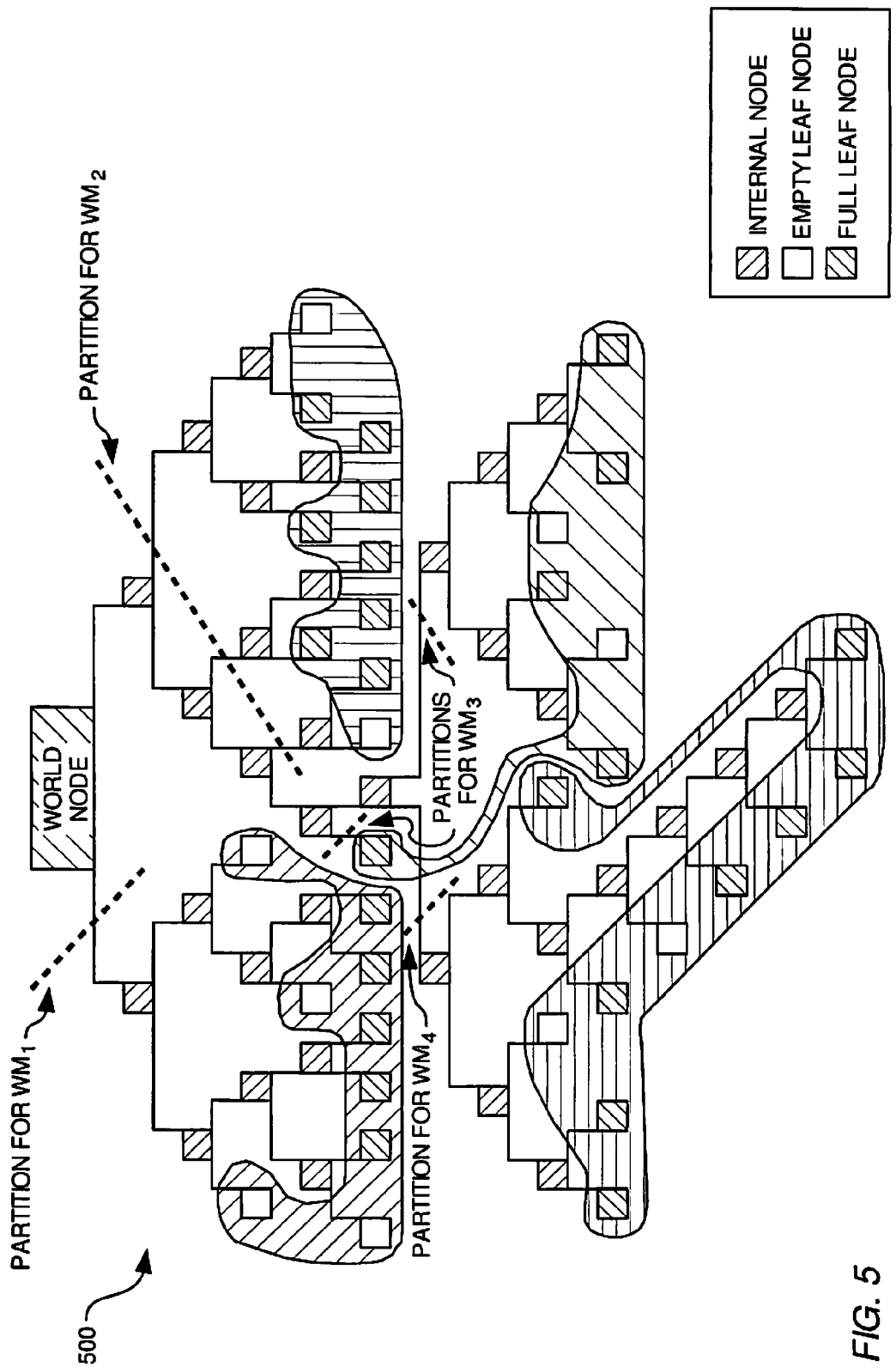
FIG. 5 illustrates an exemplary partitioned spatial index, according to one embodiment of the invention.

FIG. 5 illustrates an exemplary partitioned spatial index 500 (i.e., a kd-Tree), according to one embodiment of the invention. A spatial index may be partitioned to distribute operations related to traversing the spatial index evenly amongst multiple processing elements. The kd-tree 500 illustrated in FIG. 5 may represent a three dimensional scene to be rendered. As described above with regards to FIG. 4, a workload manager may use information defining a ray to traverse the kd-Tree. Furthermore, the workload manager may contain a plurality of processing threads and a memory cache (e.g., an L1 or L2 cache). Workload managers may traverse the kd-tree 500 by first executing ray-bounding volume intersection tests. As the ray intersects bounding volumes corresponding to the nodes, the workload manager may then traverse the kd-tree 500 by taking branches to nodes which were intersected by the ray. According to one embodiment of the invention, the workload manager may continue to execute ray bounding volume intersection tests and take branches to intersected nodes until the workload manager takes a branch to a leaf node. When the workload manager takes a branch to a leaf node, the workload manager may send the ray, for example via the inboxes 115 and/or the high speed bus 225 to a vector throughput engine for ray-primitive intersection tests.

Figure 6:
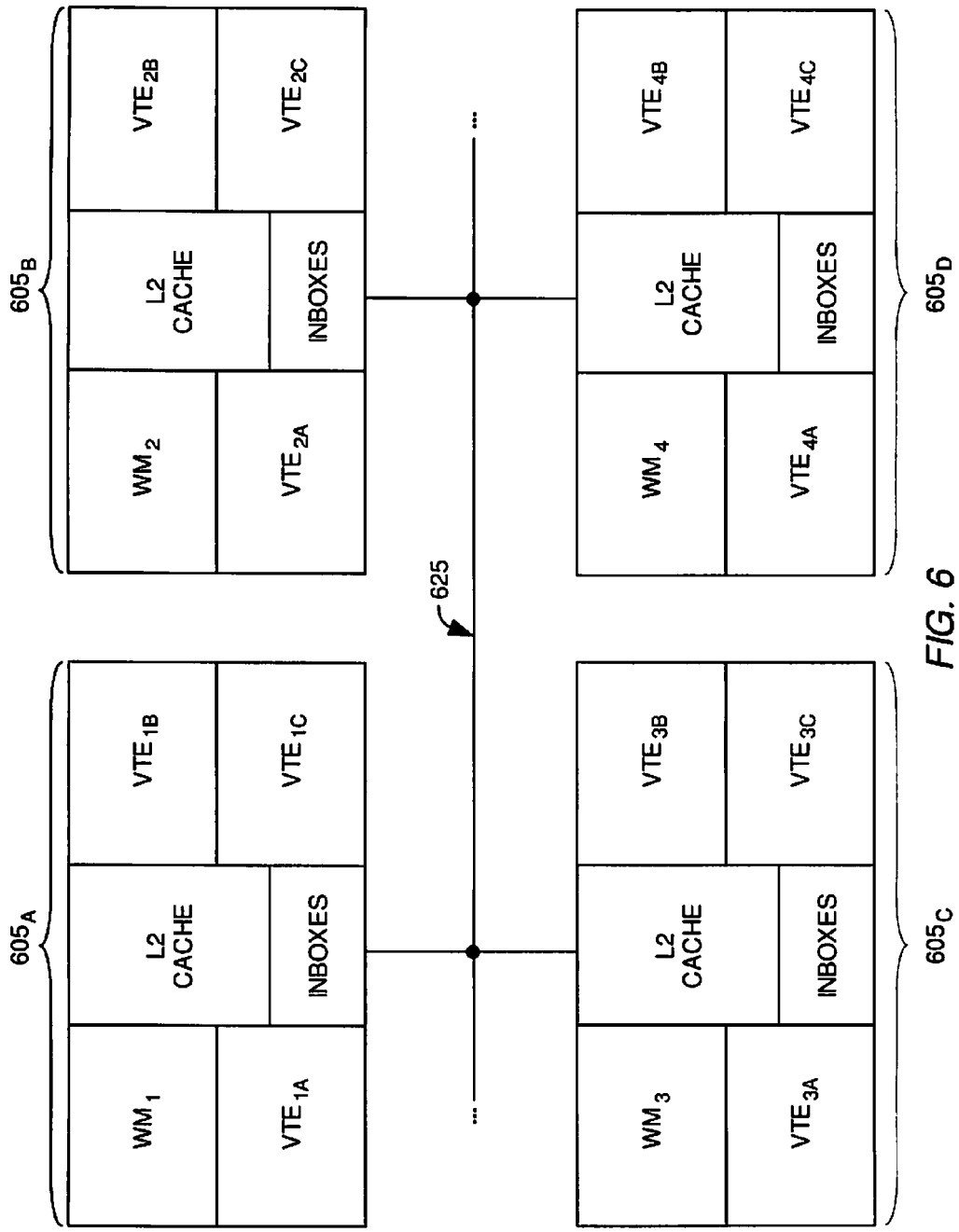

According to one embodiment of the invention, a plurality of workload managers each on separate processing cores may be used to traverse the kd-tree 500. FIG. 6 illustrates one embodiment of a plurality of workload managers each on separate processing cores. FIG. 6 illustrates four workload managers $WM_{1-4}$ on four different processing cores $605_{A-D}$. Also present on each processing core are a plurality of vector throughput engines $VTE_{1A}$-$VTE_{4C}$, a shared cache (e.g., an L2 cache) and a plurality of memory mapped inboxes. The workload managers and vector throughput engines may communicate via the inboxes and via the high speed bus 625.

According to one embodiment of the invention, as a workload manager traversing the spatial index reaches a pre-defined division or partition of a spatial index, the workload manager may send the ray (e.g., send via the inboxes a pointer to information defining the ray) to a different (e.g., a second) workload manager. The second workload manager may then begin traversing the spatial index at the point in the spatial index where the first workload manager stopped and continue traversing the spatial index (i.e., by executing ray-bounding volume intersection tests and taking braches to other nodes) until the second workload manager reaches either a leaf node or another partition of the spatial index. Thus, the spatial index may be partitioned in a way that different workload managers may be responsible for traversing different portions of the spatial index.

For example, as illustrated in FIG. 5, a dashed partitioning line is drawn in the kd-tree 500 to distinguish a partition which workload manager 1 (WM1) may be responsible for traversing. This line may represent the point in which any workload manager (e.g., WM2, WM3, WM4, etc.) traversing the kd-tree 500 may send information defining the ray to WM1. After a workload manager has sent the information defining the ray to WM1, WM1 may continue executing tasks relating to traversing the kd-tree 500 through the portion of the kd-tree which WM1 is responsible. Similarly, a second dashed partitioning line is illustrated as the beginning of the kd-tree 500 for which WM2 may be responsible for traversing, two dashed partition lines indicate the beginning of the kd-tree 500 for which WM3 may be responsible for traversing, and a dashed partition line indicates the beginning of the portion of the kd-tree which WM4 may be responsible for traversing.

According to one embodiment of the invention, several of the workload managers may be responsible for a common portion of the spatial index. Furthermore, each of those workload managers may also be responsible for traversing a portion of the spatial index which no other workload manager is responsible for traversing. For example, as illustrated in FIG. 5 by the dashed lines, the kd-tree 500 may be divided into multiple portions. Each workload manager may be responsible for traversing a portion of the kd-tree 500 below their corresponding dashed partitioning lines. Furthermore, each workload manager may be responsible for traversing the portion of the kd-tree 500 which is above all dashed partitioning lines (i.e., a portion of the kd-Tree 500 which includes the world node). Thus, as the image processing system issues rays to the workload managers for traversal through the kd-tree 500, each workload manager may begin the traversal of the ray at the world node and continue traversing the spatial index until either a leaf node is reached or a boundary indicating another workload manager is responsible for that portion of the kd-tree 500 is reached.

By having each workload manager responsible for a common portion of the spatial index which includes the world node, the image processing system may simultaneously issue a plurality of rays into the three dimensional scene. This may be accomplished by simultaneously commencing (at the world node) the traversal of a plurality of rays through the spatial index at a plurality of workload managers. A highly parallelizable system such as this may reduce the time necessary for an image processing system to render a final two dimensional image from a three dimensional scene.

For example, with reference to FIG. 5, $WM_1$ may begin traversing the spatial index with a ray at the world node. After the world node, $WM_1$ may continue traversing the spatial index (i.e., by performing ray-bounding volume intersection tests and taking branches to nodes) until it crosses a boundary indicating that another workload manager is responsible for the portion of the spatial index to which $WM_1$ is trying to traverse into. For example, $WM_1$ may take a branch which crosses the dashed partitioning line for $WM_2$. At this point $WM_1$ may cease traversing the spatial index and send (e.g., via the inboxes or the high speed bus) information defining the ray and information indicating that $WM_1$ had traversed the spatial index with the ray to the point where $WM_1$ crossed the partitioning line for $WM_2$. $WM_1$ may send the information defining the ray via the inboxes 615 and the communications network 625 to $WM_2$. Next, $WM_2$ may continue traversing the kd-tree with the ray from the point $WM_1$ stopped until $WM_2$ reaches a leaf node.

According to one embodiment of the invention, the image processing system may determine how or where to partition a spatial index. The determination of how or where to partition the spatial index may be based on a single factor or several factors. According to one embodiment of the invention, the determination of where to divide the spatial index can be made based on any number of factors including, but not limited to, the number of nodes to be assigned to each workload manager, the number of primitives contained within leaf nodes to be assigned to each workload manager, or any other suitable division which may partition the spatial index.

Furthermore, according to embodiments of the invention, the spatial index may be partitioned based on performance metrics related to the use of the spatial index (e.g., actual usage of the spatial index). For example, performance metrics may define the amount of rays which are traversed through different portions of the spatial index. The performance metrics may be calculated at periodic intervals and, the spatial index may be re-partitioned based on the performance metrics collected periodic intervals. The partitioning of the spatial index based on performance metrics may result in each workload manager being assigned an unequal number of nodes.

For example, as illustrated in FIG. 5, the partitioned portions of the kd-tree have been determined based on the number of leaf nodes each workload manager will be responsible for. As illustrated by the curved shaded areas in FIG. 5, each workload manager is responsible for seven to ten leaf nodes. Thus, the determination of where to partition the kd-Tree resulted in each workload manager being responsible for approximately the same number of leaf nodes. By evenly distributing the number of nodes each workload manager in this manner, the amount of workload (i.e., calculations relating to traversing the spatial index) each workload manager is presented may be reduced.

Although the kd-Tree illustrated in FIG. 5 has seventy-one nodes, according to embodiments of the invention, the entire spatial index may have many more nodes (e.g., hundreds of thousands or millions of nodes). Furthermore, each node may require several bytes to data to define (e.g., 8 bytes). Therefore, the entire spatial index may require a large amount of storage space.

In order to decrease the amount of time necessary to render a final image using a ray tracing image processing system, it may be desirable to cache the spatial index in an on chip cache memory (e.g., the L2 cache of the multiple core processing element $605_A$) rather than in off chip memory. However, a complex spatial index containing many nodes may require such a large amount of memory space that storing the spatial index in an on chip cache may not be feasible or efficient.

By partitioning a spatial index, it may be possible to reduce the amount of cache memory required by a workload manager to traverse the spatial index. As described above, workload managers traversing a partitioned spatial index may be responsible for traversing portions of the spatial index, and, consequently, they may not be responsible for traversing other portions of the spatial index. Thus, a workload managers (e.g., $605_A$) may only need to store in their on chip cache memory (e.g., L2 cache memory of the workload manager $605_A$) the portion or portions of the spatial index which the workload manager is responsible for traversing. Therefore, by only storing a portion of a spatial index, the amount of information needed to be stored for the workload manager to traverse the spatial index is reduced, and the amount of cache memory space necessary to store the spatial index is reduced.

Conclusion

In conclusion, an image processing system may partition a spatial index into different portions. By partitioning the spatial index, different workload managers may be responsible for performing operations relating to traversing different portions of the spatial index. A particular workload manager may be responsible for traversing only a portion of the entire spatial index. Consequently, the workload manager may only need information defining the portion of the spatial index for which the workload manager is responsible for traversing. This may reduce the amount of cache memory space needed to store information defining the spatial index for which the workload manager is responsible.

While the foregoing is directed to embodiments of the present invention, other and further embodiments of the invention may be devised without departing from the basic scope thereof, and the scope thereof is determined by the claims that follow.

What is claimed is:

1. A method of partitioning a spatial index having nodes defining bounding volumes of a three dimensional scene, the method comprising:
   providing a first processing element and a second processing element; and
   partitioning the spatial index into at least a first portion and a second portion, wherein algorithms associated with traversing a ray through the first portion are executed only by the first processing element, and
   wherein algorithms associated with traversing a ray through the second portion are executed only by the second processing element,
   wherein the first processing element traverses the spatial index until a predefined partition of the spatial index is reached and the second processing element begins traversing the spatial index from a point where the first processing element stopped traversing the spatial index.

2. The method of claim 1, wherein the method further comprises:
   partitioning the spatial index into a third portion, wherein the first processing element and the second processing element execute algorithms associated with traversing a ray through the third portion.

3. The method of claim 1, wherein the first processing element is located on a first processing core and the second processing element is located on a second processing core.

4. The method of claim 1, wherein partitioning the spatial index comprises:
   determining a number of nodes in the spatial index; and
   partitioning the spatial index based on the number of nodes in the spatial index such that the number of nodes in the spatial index is distributed evenly between the first processing element and the second processing element.

5. The method of claim 1, wherein partitioning the spatial index comprises:
   determining a workload of at least one of the first processing element or the second processing element; and
   partitioning the spatial index such that the workload is distributed evenly between the first processing element and the second processing element.

6. The method of claim 1, wherein partitioning the spatial index comprises:
   determining a number of primitives contained within leaf nodes of the spatial index; and
   partitioning the spatial index based on the number of primitives contained within leaf nodes of the spatial index such that the number of primitives is distributed evenly between the first processing element and the second processing element.

7. The method of claim 1, wherein the first portion is stored within a memory cache of the first processing element, and wherein the second portion is stored within a memory cache of the second processing element.

8. The method of claim 1, wherein partitioning the spatial index into at least the first portion and the second portion occurs at periodic intervals.

9. A method of traversing a spatial index having nodes defining bounding volumes of a three dimensional scene, comprising:
   partitioning the spatial index into at least a first partition and a second partition by creating at least one partition boundary through at least one branch of the spatial index, wherein algorithms associated with traversing a ray through the first portion are executed only by a first processing element, and wherein algorithms associated with traversing the ray through the second portion are executed only by a second processing element, wherein the first processing element traverses the spatial index until a predefined partition of the spatial index is reached and the second processing element begins traversing the spatial index from a point where the first processing element stopped traversing the spatial index;
   generating the ray into the scene;
   traversing the spatial index by taking branches from internal nodes until a leaf node is reached, wherein branches are taken based on whether the ray intersects bounding volumes defined by the nodes; and
   passing information defining the ray from the first processing element to the second processing element when the branch containing the partition boundary is taken.

10. The method of claim 9, wherein partitioning the spatial index comprises:
    determining a number of nodes in the spatial index;
    creating the partition boundary such that the number of node in the spatial index is distributed evenly between the first partition and the second partition.

11. The method of claim 9, wherein partitioning the spatial index comprises:
    determining a workload of at least one of the first processing element or the second processing element; and
    creating the partition boundary such that the workload is distributed evenly between the first processing element and the second processing element.

12. The method of claim 9, wherein the first processing element is located on a first processing core and the second processing element is located on a second processing core.

13. The method of claim 9, wherein the first portion is stored within a memory cache of the first processing element, and wherein the second portion is stored within a memory cache of the second processing element.

14. A system, comprising:
a spatial index having nodes defining bounding volumes of a three dimensional scene;
a first processing element;
a second processing element; and
an image processing system configured to partition the spatial index into at least a first portion and a second portion, wherein algorithms associated with traversing a ray through the first portion are executed only by the first processing element, and wherein algorithms associated with traversing a ray through the second portion are executed only by the second processing element,
wherein the first processing element traverses the spatial index until a predefined partition of the spatial index is reached and the second processing element begins traversing the spatial index from a point where the first processing element stopped traversing the spatial index.

15. The system of claim 14, wherein the image processing system is further configured to partition the spatial index into a third portion, wherein the first processing element and the second processing element execute algorithms associated with traversing a ray through the third portion.

16. The system of claim 14, further comprising:
a first processing core; and
a second processing core; and
wherein the first processing element is located on the first processing core and the second processing element is located on the second processing core.

17. The system of claim 14, wherein the image processing system is further configured to:
determine a number of nodes in the spatial index; and
partition the spatial index based on the number of nodes in the spatial index such that the number of nodes in the spatial index is distributed evenly between the first processing element and the second processing element.

18. The system of claim 14, wherein the image processing system is further configured to:
determine a workload of at least one of the first processing element or the second processing element; and
partition the spatial index such that the workload is distributed evenly between the first processing element and the second processing element.

19. The system of claim 14, wherein the image processing system is further configured to:
determine a number of primitives contained within leaf nodes of the spatial index; and
partition the spatial index based on the number of primitives contained within leaf nodes of the spatial index such that the number of primitives is distributed evenly between the first processing element and the second processing element.

20. The system of claim 14, further comprising:
a cache memory for the first processing element; and
a cache memory for the second processing element; and
wherein the first portion is stored in the cache memory for the first processing element, and the second portion is stored within the cache memory for the second processing element.

* * * * *